United States Patent [19]

Braithwaite

[11] Patent Number: 4,810,278

[45] Date of Patent: Mar. 7, 1989

[54] MOULDING MECHANISM FOR A GLASSWARE FORMING MACHINE

[75] Inventor: David Braithwaite, Kirksandall, England

[73] Assignee: Emhart Industries, Inc., Farmington, Conn.

[21] Appl. No.: 134,343

[22] Filed: Dec. 17, 1987

[30] Foreign Application Priority Data

Jan. 6, 1987 [GB] United Kingdom ............... 8700175

[51] Int. Cl.⁴ .............................................. C03B 11/12
[52] U.S. Cl. ........................................ 65/267; 65/319; 65/356
[58] Field of Search .................. 65/267, 319, 355, 356

[56] References Cited

U.S. PATENT DOCUMENTS

| | | | |
|---|---|---|---|
| 4,490,164 | 12/1984 | Neblung et al. | 65/319 X |
| 4,609,393 | 9/1986 | Boutier | 65/267 X |
| 4,657,573 | 4/1987 | Jones | 65/267 X |
| 4,690,703 | 9/1987 | Kulig | 65/267 X |
| 4,701,202 | 10/1987 | Foster | 65/319 X |

*Primary Examiner*—Robert L. Lindsay
*Attorney, Agent, or Firm*—Spencer T. Smith

[57] ABSTRACT

A moulding mechanism for a glassware forming machine comprises a mould (30; 170, 172), a supporting plate (31; 174) supporting at least a bottom portion of the mould, a plenum chamber (32, 34; 176, 177) extending downwardly from the supporting plate and arranged to supply air at substantially equal pressure to passages (33, 175) in the supporting plate which communicate with cooling passages (50; 192, 194) in the mould, and a piston and cylinder assembly (36, 38; 178, 180) operable to raise and lower the supporting plate (31; 174). At least a portion of the plenum chamber (32, 34; 176, 177) is formed as a tubular piston rod (34; 177) extending upwardly from the piston (36; 178) of the piston and cylinder assembly.

1 Claim, 5 Drawing Sheets

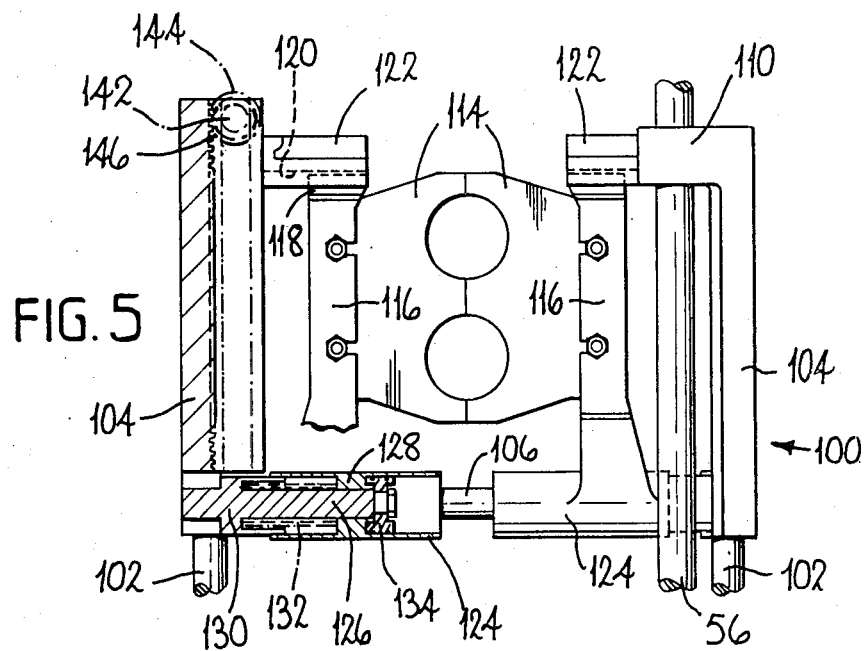
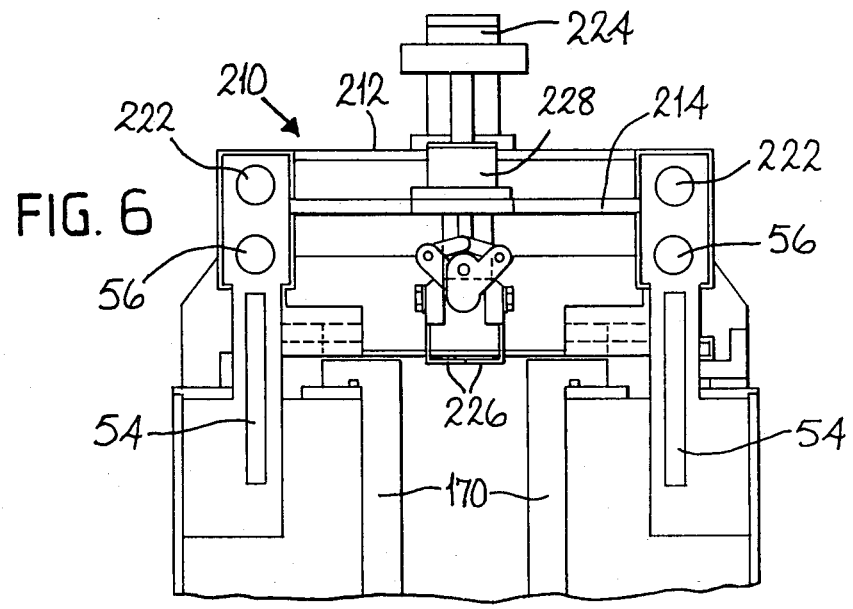

MOULDING MECHANISM FOR A GLASSWARE FORMING MACHINE

BACKGROUND OF THE INVENTION

This invention is concerned with a moulding mechanism for a glassware forming machine, for example a glassware forming machine of the individual section type.

In U.S. Pat. No. 4,710,202, there is described a system for cooling one or more moulds of a moulding mechanism of a glassware forming machine of the individual section type. The moulding mechanism comprises a mould defining a cavity in which molten glass can be moulded and defining a plurality of cooling passages for the passage of cooling air through the mould, each cooling passage having an entrance in a bottom surface of the mould and extending upwardly through the mould. The mould has two movable side portions and a bottom plate mounted on a supporting plate. The mould side portions are movable into engagement with one another and the bottom plate to define a mould cavity and are separatable to allow removal of moulded glass from the mould. The supporting plate forms an upper wall of a plenum chamber extending downwardly and arranged to supply air, introduced by blowing means into an entrance of the plenum chamber, to passages in the supporting plate at substantially the same pressure. The passages in the supporting plate communicate, when the mould side portions are in engagement with one another and the bottom plate, with the cooling passages in the mould so that cooling air passes through the cooling passages.

The supporting plate is adjustable heightwise to accommodate moulds of differing heights but remains stationary during the operation of the machine. However, in other types of moulding mechanism, the entire mould or the bottom plate is raised and lowered during the operation of the machine by a piston and cylinder assembly located beneath the mould (see, for example, the moulding mechanisms described in U.S. Pat. No. 3,914,120). The presence of the piston and cylinder assembly beneath the mould prevents the installation of a plenum chamber of the type described in U.S. Pat. No. 4,701,202.

It is an object of the present invention to provide a moulding mechanism of the type in which at least a portion of the mould is raised and lowered during operation of the mechanism with a cooling system having the advantages of that described in U.S. Pat. No. 4,701,202.

BRIEF SUMMARY OF THE INVENTION

The invention provides a moulding mechanism for a glassware forming machine comprising a mould defining a cavity in which molten glass can be moulded, and defining a plurality of cooling passages for the passage of cooling air through the mould, each cooling passage having an entrance in a bottom surface of the mould and extending upwardly through the mould, a supporting plate on which at least a bottom portion of the mould is supported, the supporting plate defining passages therethrough which communicate with the cooling passages in the mould, a plenum chamber extending downwardly from the supporting plate, the plenum chamber being arranged to supply air introduced into an entrance of the plenum chamber to each of the passages in the supporting plate at substantially the same pressure, blowing means arranged to blow air into the plenum chamber through the entrance thereof, and a piston and cylinder assembly operable to raise the supporting plate into a moulding position or to lower the supporting plate to allow removal of moulded glass from the mould cavity, wherein at least the portion of the plenum chamber which defines the entrance thereof is formed as a tubular piston rod extending upwardly from the piston of the piston and cylinder assembly.

In a moulding mechanism according to the last preceding paragraph, the air supply to the plenum chamber passes through the tubular piston rod thereby enabling both the piston and cylinder assembly and the plenum chamber to be installed.

The invention may be applied to a moulding mechanism wherein the mould is a one-piece mould for forming parisons at the parison-forming station of a glassware forming machine of the individual section type, operation of the piston and cylinder assembly to lower the supporting plate lowering the mould to allow removal of a parison.

The invention may also be applied to a moulding mechanism wherein the mould comprises two side portions and a bottom plate, only the bottom plate being supported by the supporting plate, the side portions being movable into engagement with one another and the bottom plate to define the mould cavity and away from one another to allow removal of moulded glass, cooling passages in the bottom plate being arranged to communicate with cooling passages in the side portions when the side portions are in engagement with one another and with the bottom plate.

There now follows a detailed description to be read with reference to the accompanying drawings of a glassware forming machine which incorporates two moulding mechanisms which are illustrative of the invention. It is to be understood that the illustrative machine has been selected for description by way of example and not of limitation of the invention.

BRIEF DESCRIPTION OF THE DRAWINGS

In the drawings:

FIG. 5 is a view taken in the direction of the arrow V in FIG. 1 of an intermediate station of the illustrative machine; and FIG. 6 is a view taken in the direction of the arrow VI in FIG. 1.

DETAILED DESCRIPTION

Figure 1:
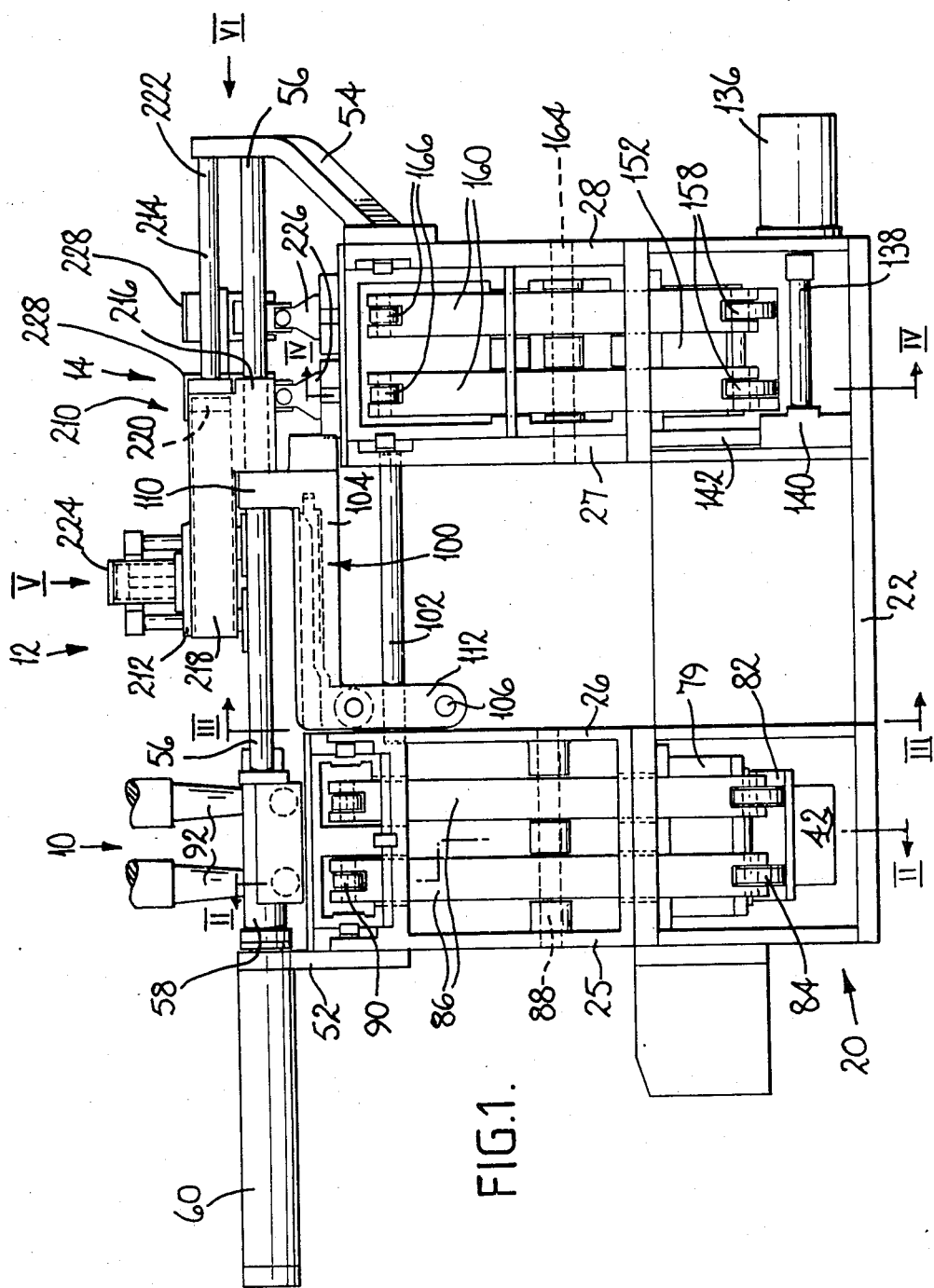
FIG. 1 is a side elevational view of the illustrative machine.

The illustrative glassware forming machine is of the individual section type and comprises a parison-forming station 10 at which gobs of molten glass are formed into parisons, an intermediate station 12, and an article-forming station 14 at which parisons are formed into articles of glassware. The intermediate station 12 is between the stations 10 and 14 and enables parisons formed at the station 10 to be treated before delivery to the station 14 or parisons to be rejected by being dropped into a cullet chute 16 (see FIG. 3).

The illustrative machine comprises a supporting frame 20 which comprises a base plate 22, side plates 24 and four vertically-extending transverse plates 25, 26, 27 and 28, the plates 25 and 26 being at opposite edges of the station 10 and the plates 27 and 28 being at opposite edges of the station 14.

Figure 2:
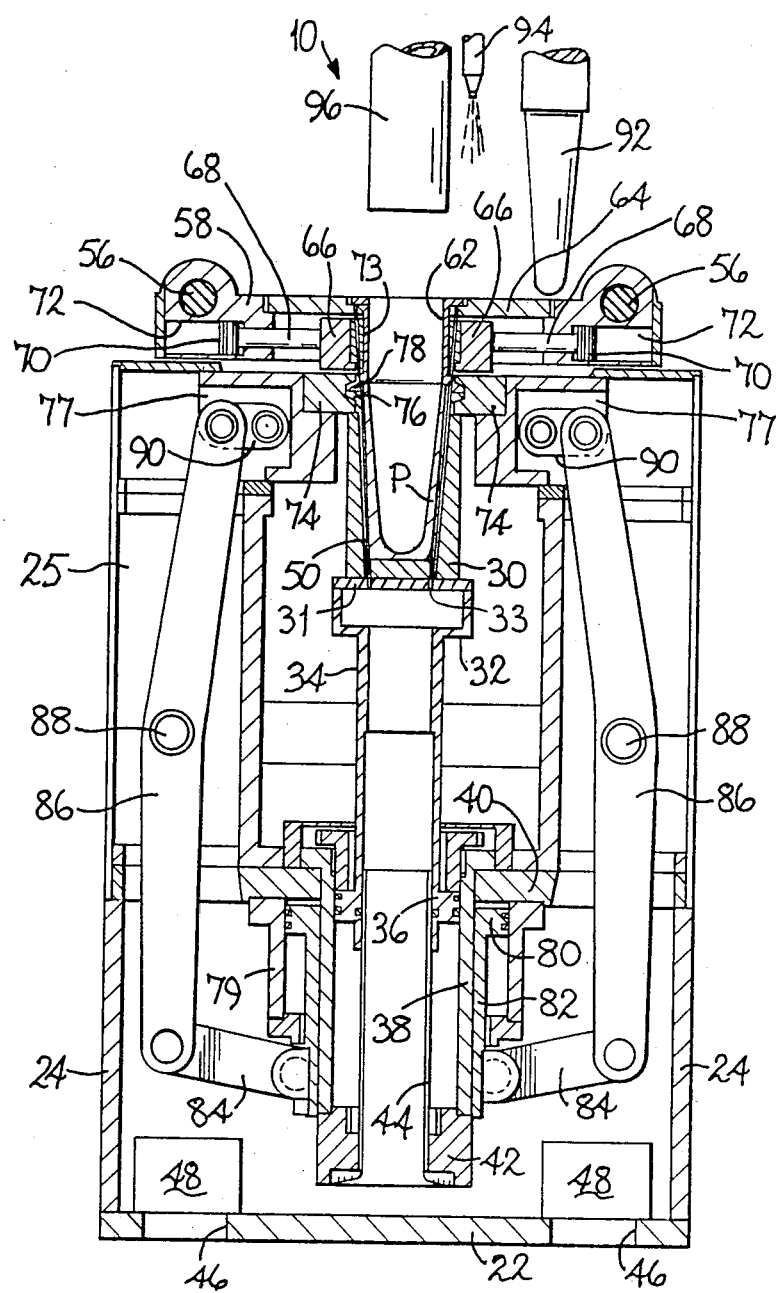
FIG. 2 is a cross-sectional view taken on the line II—II in FIG. 1.

The parison-forming station 10 is shown in FIG. 2. At the station 10 two parisons are formed simultaneously by a first moulding mechanism of the machine. The moulding mechanism comprises two one-piece blank moulds 30 each defining a cavity in which molten glass gobs can be moulded into parisons. Each mould 30 also defines a plurality of cooling passages 50 for the passage of cooling air through the mould 30. Each passage 50 has an entrance in a bottom surface of the mould 30 and extends upwardly in the mould.

The moulds 30 are supported on a supporting plate 31 of the first moulding mechanism which defines passages 33 therethrough which communicate with the passages 50 in the moulds 30 (FIG. 2).

A plenum chamber of the first moulding mechanism extends downwardly from the supporting plate 31 and is arranged to supply air introduced into an entrance of the plenum chamber to each of the passages 33 in the supporting plate 31 at substantially the same pressure. The plenum chamber comprises an upper box-like portion 32 and a lower tubular portion 34 which defines the entrance of the plenum chamber and is formed as a tubular piston rod which extends upwardly from a piston 36 movable vertically within a cylinder 38 of a piston and cylinder assembly of the first moulding mechanism. The cylinder 38 is supported by a cross member 40 extending transversely between two side plates 24 of the machine frame. Introduction of air under pressure into the cylinder 38 enables the supporting plate 31 and the moulds 30 to be raised into a moulding position or lowered to allow removal of moulded glass from the mould cavities of the moulds 30. A bottom end cap 42 of the cylinder 38 supports a tube 44 which extends upwardly through the end cap 42 into the cylinder 38 and is telescopically received in a passage through the piston 36, seals being provided beween the tube 44 and the piston 36 and between the tube 44 and the end cap 42. The tube 44 allows air introduced into the interior of the machine frame 20 through orifices 46 in the bottom plate 22 to pass through the tube 44 into the tubular piston rod 34 and from thence into the box-like portion 32. The air is introduced by blowing means (not shown) in the form of a fan operable to blow air into ducting in a machine base (not shown) on which the plate 22 rests. The ducting leads to the orifices 46. Valves 48 are provided to control passage of mould cooling air through the orifices 46 from the ducting. The passage of cooling air is controlled in an on/off manner. The air passes upwardly through the tube 44 and the plenum chamber 32, 34 and through the passages 33 in the supporting plate 31 into the cooling passages 50 in the moulds 30.

The transverse plates 25 and 28 support upwardly-extending brackets 52 and 54 respectively (see FIG. 1). These brackets 52 and 54 support two longitudinally-extending guide rods 56 which extend parallel to one another. A carriage 58 is mounted for sliding movement along the guide rods 56 between the parison-forming station 10 and the intermediate station 12. The carriage 58 provides parison transferring means operable to transfer parisons from the station 10 to the station 12. The carriage 58 is arranged to be moved between the stations 10 and 12 by the action of a pneumatic piston and cylinder assembly 60 mounted on the bracket 52 and having a piston rod secured to the carriage 58.

The carriage 58 supports two funnels 62 (see FIG. 2) which are arranged to guide gobs of molten glass into the moulds 30, the funnels 62 being supported by a removable transversely-extending plate 64 of the carriage 58. The carriage 58 also supports two neck ring halves 66 which are arranged to cooperate with the moulds 30 in shaping the neck regions of parisons P and to support parisons during movement of the carriage 58 from the parison-forming station 10 to the intermediate station 12. The neck ring halves 66 are mounted on piston rods 68 of pistons 70 movable in horizontally-extending cylinders 72 formed in the carriage 58. The piston and cylinder assemblies 70, 72 are operable pneumatically to move the neck ring halves 66 towards or away from one another. The neck ring halves 66 have cooling passages 73 therein arranged to receive air from the cooling passages 50 in the moulds 30.

The parison forming station 10 has two mould and neck ring clamping members 74 arranged to clamp an upper flange 76 of each mould 30 to a lower flange 78 of the associated neck ring halves 66. The clamping member 74 have complementary grooves to the flanges 76 and 78 and are arranged on opposite sides of the moulds 30 and are mounted on supports 77 which are mounted on the frame 20 for horizontal sliding movement towards or away from one another. The supports 77 are moved by operation of a pneumatic piston and cylinder assembly comprising a vertically-extending cylinder 79, which is supported by the cross member 40 and encircles the piston and cylinder assembly 36, 38, and a piston 80 which has a downwardly-extending tubular piston rod 82 whose interior cylindrical surface slides on the outside of the cylinder 38. A lower end portion of the piston rod 82 is pivotally connected to four links 84. Each link 84 is pivotally connected to a lower end portion of one of four levers 86 which extend upwardly two on each side of the moulds 30. The levers 86 are pivotally mounted at central portions thereof on two shafts 88 supported by the plates 25 and 26, two levers 86 being pivoted on each shaft 88. Upper end portions of the levers 86 are pivotally connected to links 90 which are also pivotally connected to the supports 77. When the piston and cylinder assembly 79, 80 is operated to move the piston 80 downwardly, the links 84 pull the lower end portions of the levers 86 towards the cylinder 79 and the clamping members 74 are pulled apart. Operation of the assembly 79, 80 in the opposite direction results in the clamping members 74 being forced together.

At the parison-forming station 10 but mounted above the frame 20 on support beams (not shown) are two plungers 92, two lubricant spray heads 94 and two gob guides 96. The plungers 92, spray heads 94 and guides 96 can be moved en bloc transversely of the machine so that they can all be aligned with the moulds 30 by a pneumatic piston and cylinder assembly (not shown) and the plungers 92 can be lowered into the moulds 30 and withdrawn therefrom by pneumatic piston and cylinder assemblies (not shown).

The operation of the parison forming station 10 will now be described. When gobs of molten glass are to be received into the moulds 30, the guides 96 are aligned with the moulds 30 which are in their upper position with the piston 36 at the top of the cylinder 38, the neck ring halves 66 are engaging one another, and the clamping members 74 are clamping the neck ring halves 66 to the moulds 30. In this condition, gobs are dropped down the guides 96, pass through the funnels 62 and enter the moulds 30. The guides 96, the spray heads 94, and the plungers 92 are moved transversely of the machine until the plungers 92 are aligned with the moulds 30. Next, the plungers 92 are lowered into the moulds 30 so that the gobs are pressed against the moulds 30 and neck ring halves 66 into parisons P. The plungers 92 are then raised out of the moulds 30, the piston and cylinder assembly 79, 80 is operated to withdraw the clamping members 74 from the moulds 30, the piston and cylinder assembly 36, 38 is operated to lower the moulds 30 clear of the parisons P, and the parisons are left supported by the neck ring halves 66. The piston and cylinder assembly 60 is now operated to move the carriage 58 to the station 12 taking the parisons P with it. On return of the carriage 58 from the station 12, the assemblies 36, 38 and 79, 80 are operated to return the station 10 to condition to receive further gobs. During the formation of parisons, the moulds 30 are cooled by passage of air through the passages 50 as described above. When it is desired, to lubricate the moulds 30, the station 10 is operated but gobs are not dropped into the moulds 30 and as the spraying heads 94 pass over the moulds 30 they spray lubricant thereinto.

Figure 3:
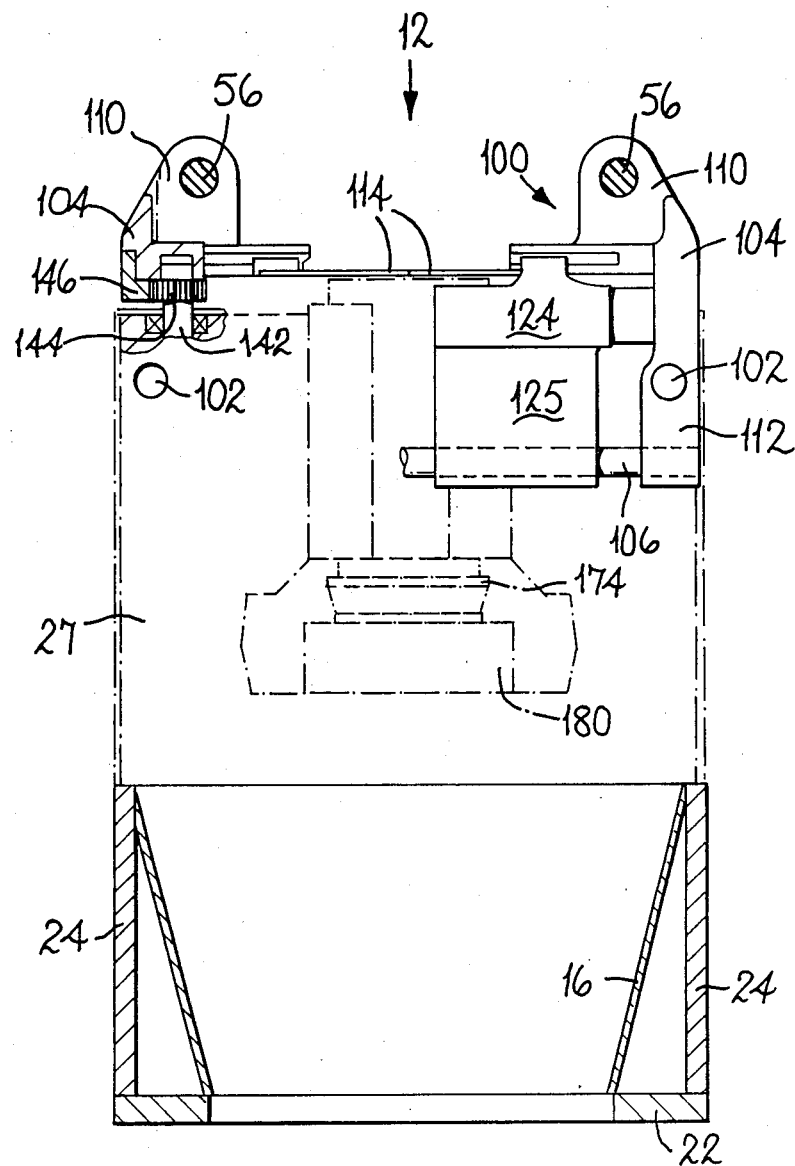
FIG. 3 is a cross-sectional view taken on the line III—III in FIG. 1.

The intermediate station 12 is shown in FIG. 3 at a time when the carriage 58 is at the station 10. However, when the carriage 58 is at the station 12, the piston and cylinder assemblies 70, 72 are operated to release the parisons P from the neck ring halves 66. As the carriage 58 returns to the station 10, the assemblies 70, 72 are operated again to return the neck ring halves 66 to engagement with one another.

At the intermediate station 12, the parisons P can be rejected by being dropped into th cullet chute 16 or treated by mechanisms located at the station 12 (such mechanisms are not shown in the drawings).

The illustrative glassware forming machine comprises parison transferring means operable to transfer parisons P from the intermediate station 12 to the article-forming station 14. This parison forming means comprises a carriage 100 and parison gripping means, the parison gripping means being mounted on the carriage 100. The carriage 100 is mounted for sliding movement on the guide rods 56 and also on two guide rods 102 supported by the transverse plates 26 and 27. The carriage 100 can slide along the rods 56 and 102 between a parison gripping position thereof at the intermediate station 12 at which the parison gripping means can grip parisons P, and a parison releasing position at the article-forming station 14 at which the parison gripping means can release the parisons for forming into articles.

The carriage 100 (FIGS. 1, 3 and 5) comprises two side members 104 and a transversely extending rod 106 interconnecting the side members 104. Each side member 104 is slidable on one of the rods 56 and one of the rods 102. Each side member 104 has an upwardly-extending portion 110 at a front end portion thereof (the end nearest the station 14 when the carriage 100 is at the station 12) which is slidable on one of the rods 56, and a depending portion 112 at a rear end portion thereof which is slidable on one of the rods 102. The rod 106 is secured to the portions 112 of the side members 104.

The parison gripping means of the parison transferring means operable to transfer parisons from the intermediate station 12 to the article-forming station 14 comprises two neck ring halves 114 each of which is mounted on one of two supports 116 which are mounted on the carriage 100 for movement towards one another, to bring the neck ring halves 114 into gripping engagement, or away from one another, to separate the halves 114. Each support 116 has a front end portion 118 (FIG. 5) which is slidably-received in a slideway 120 formed on a transverse projection 122 from one of the side members 104. The rear end portion of each support 116 is formed into a cylinder 124 which is slidably mounted on a stub shaft 126 which projects transversely from one of the side members 104. Each cylinder 124 also has a downward projection 125 which is slidable on the rod 106. There are, thus, two stub shafts 126 aligned with one another but with a gap between them. Each cylinder 124 has an internal flange 128 which is slidable on the shaft 126 and the shaft 126 has an external flange 130. A spring 132 acts between the flanges 128 and 130 to urge the neck ring half 114 on the support 116 into gripping engagement with the other neck ring half 114. A piston 134 is mounted on the shaft 126 on the opposite side of the flange 128 from the spring 132 so that, by introduction of air under pressure into the cylinder 124 between the piston 134 and the flange 128, the support 116 can be moved against the action of the spring 132.

The parison transferring means for transferring parisons to the article-forming station 14 also comprises servo-controlled drive means operable to move the carriage 100 between the parison gripping position at the intermediate station 12 and the parison releasing position at the article-forming station 14 according to a predetermined position against time curve. Suitable position against time curves and suitable control systems are described in the specification of European Patent No. 0, 059,568. The drive means comprises an electric motor 136 (FIG. 1) which, in the illustrative machine, is a precision permanent magnet D.C. motor which, is servo-controlled by a control system as mentioned in the abovementioned specification. The motor 136 is mounted on the plate 28 and drives an output shaft 138 which drives a right angle gear box 140. The output shaft 142 of the gear box 140 extends upwardly and has a pinion 144 (FIGS. 3 and 5) mounted thereon. The pinion 144 meshes with a rack 146 mounted on one of the side members 104. Thus, operation of the motor 136 causes the pinion 144 to turn and the rack 146 and, thus, the carriage 100 to move.

When the carriage 100 is at the intermediate station 12, the piston and cylinder assemblies 124, 134 are operated to move the neck ring halves 114 apart. As the carriage 58 moves to the intermediate station 12 carrying parisons P, the parisons P pass between the cylinders 124 and above the rod 106 and arrive between the neck ring halves 114. The cylinders 124 are now de-pressurised so that the springs 132 move the neck ring halves 114 together so that they grip the parisons beneath the neck ring halves 66. The piston and cylinder assemblies 70, 72 are now operated so that the neck ring halves 66 release the parisons which are now supported by the neck ring halves 114. The carriage 58 now returns to the station 10. If the parisons are to be rejected, the piston and cylinder assemblies 124, 134 are operated so that the neck ring halves 114 release the parisons which fall into the cullet chute 16. If the parisons are not to be rejected, they remain at the station 12 supported by the neck ring halves 114 until any treatment of the parisons has been carried out and then the motor 136 is operated to move the carriage 100 with the parisons to the station 14.

Figure 4:
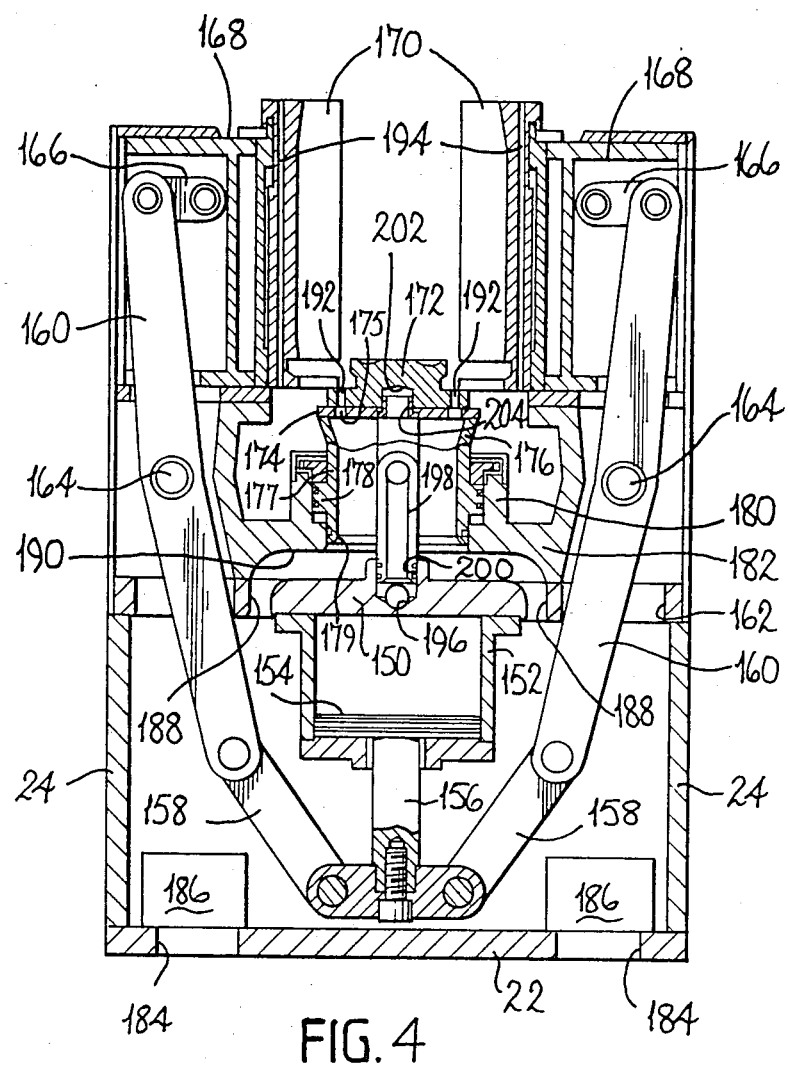
FIG. 4 is a cross-sectional view taken on the line IV—IV in FIG. 1.

At the article-forming station 14 (FIG. 4), there is a further moulding mechanism of the machine. The further moulding mechanism comprises a vertically-extending cylinder 152 which is supported on the underside of a cross member 150 which extends between the side plates 24 and has a piston 154 movable therein. The piston 154 has a downwardly-extending piston rod 156 which is pivotally connected to four links 158. Each link 158 is pivotally connected to one of four levers 160 which extend upwardly two on each side of the cylinder 152. Each lever 160 passes through a hole 162 in the cross member 150 and is pivotally mounted on a longitudinally-extending rod 164 supported by the plates 27 and 28. There are two rods 164, one on each side of the machine, with two of the levers 160 mounted on each. The upper end portion of each lever 160 is pivotally connected to a link 166 which is pivotally connected to one of two mould side portion supports 168 of the moulding mechanism which are mounted on the frame 20 for sliding movement towards or away from one another. Operation of the piston and cylinder assembly 152, 154 to move the piston 154 downwardly causes the lower end portions of the levers 160 to be pulled towards the cylinder 152 so that the supports 168 are moved apart (to the condition shown in FIG. 4). Operation of the assembly 152, 154 in the opposite direction causes the supports 168 to be moved towards one another.

The further moulding mechanism also comprises two moulds each defining a cavity in which molten glass parisons can be moulded. Each mould comprises two finish mould side portions 170, one mounted on each of the supports 168 in conventional manner. Each mould also comprises a bottom plate 172. The side portions 170 are movable, by movement of the supports 168, into engagement with one another and the bottom plate 172 to define mould cavities and away from one another, again by movement of the supports 168, to allow removal of moulded glass articles.

There are thus two bottom plates 172 which are supported on a supporting plate 174 of the moulding mechanism.

The further moulding mechanism also comprises a plenum chamber extending downwardly from the supporting plate 174. This plenum chamber is arranged to supply air introduced into an entrance thereof to each of a plurality of passages 175 defined by and passing through the supporting plate 174. The air is supplied to each passage 175 at substantially the same pressure. The plenum chamber comprises tapering walls 176 extending downwardly from the supporting plate 174 and a tubular portion 177. The tubular portion 177 extends downwardly and at its lower end defines the entrance 179 of the plenum chamber. The tubular portion 177 is formed as a tubular piston rod extending upwardly and downwardly from a piston 178 of a piston and cylinder assembly of the further moulding mechanism. The piston and cylinder assembly, which also comprises a vertically-disposed cylinder 180, is operable pneumatically to raise the supporting plate 174 into a moulding position (shown in FIG. 4) or to lower the supporting plate 174 and the bottom plates 172 to allow removal of moulded glass articles from the mould cavities. The tubular piston rod 177 extends right through the cylinder 180 so that the entrance 179 is below the cylinder 180. The cylinder 180 is supported by a portion 182 of the frame 20 which is mounted on top of the cross member 150.

In order to provide cooling air to the mould side portions 170, two orifices 184 are formed in the bottom plate 22 so that air can enter the machine frame at the station 14 from ducting in the aforementioned machine base (not shown) into which blowing means of the moulding mechanism in the form of a fan (not shown) is arranged to blow air. On/off valves 186 are provided to control the duration of air entry. Air entering the frame passes through openings 188 in the cross member 150 and passages 190 formed between the cross member 150 and the frame portion 182. The air then enters the entrance 179 of the plenum chamber 176, 177 and arrives at the underside of the plate 174. From here, the air passes upwardly through the passages 175 defined by the plate 174. The air then passes upwardly through cooling passages in the moulds which each have an entrance in a bottom surface of one of the moulds and extend upwardly through the mould. Each cooling passage comprises a portion 192, defined by a bottom plate 172 and communicating with a passage 175 in the supporting plate 174, and a portion 194 defined by one of the side portions 170 and communicating with the portion 192 when the side portions 170 engage one another and the bottom plate 172. The bottom plates 172 are also connected to a vacuum passage 196 in the cross member 150 by a pipe 198 which is telescopically-received in a recess 200 in the cross member 150 which communicates with the passage 196. The pipe 198 passes upwardly through the tubular piston rod 177 and branches to enter recesses 202 in each of the bottom plates 172, adaptors 204 of conventional construction being provided in holes in the plate 174 for connecting the recesses 202 to the pipe 198.

The illustrative machine also comprises article removing means operable to remove articles from the article-forming station 14. The article removing means (which has been omitted from FIG. 5 in the interests of clarity) comprises a carriage 210 which is mounted for movement between an article gripping position at the article-forming station 14 at which article gripping means of the article removing means mounted on the carriage 210 can grip an article and an article releasing position at which articles can be released on to a dead plate (not shown). The carriage 210 comprises two transversely-mechanism extending plates, a rearward plate 212 and a forward plate 214, interconnecting two side portions each of which comprises a depending portion 216 which is slidable on one of the guide rods 56 and a horizontally-extending pneumatic cylinder 218. Each cylinder 218 contains a fixedly-mounted piston 220 with a forwardly-extending piston rod 222 secured to one of the brackets 54.

The rearward plate 212 of the carriage 210 supports two blowheads (not shown) of conventional construction operable to blow air into parisons to cause them to expand, and a piston and cylinder assembly 224 operable to raise or lower the blowheads. The forward plate 214 of the carriage 210 supports the aforementioned article gripping means which comprises two pairs of tongs 226 of conventional construction and two piston and cylinder assemblies 228 for opening or closing the tongs 226.

The piston and cylinder assemblies 218, 220 provide drive means of the machine operable to drive the carriage 210 from the article-releasing position to the article-gripping position at the article-forming station 14. The carriage 100 of the parison transferring means and the carriage 210 of the article removing means are so aligned with one another that, as the carriage 100 moves from the parison gripping position at the intermediate station 12 to the parison-releasing position at the article-forming station 14, it pushes the carriage 210 from the article-gripping position to the article-releasing position. Specifically, the portions 110 of the carriage 100 engage the portions 216 of the carriage 210 and push them along the guide rods 56. When the carriage 100 returns to the intermediate station 12, the portions 110 separate from the portions 216 until the action of the piston and cylinder assembly 218, 220 moves the portions 210 back into engagement with the portions 110.

In the operation of the machine, in order to transfer parisons from the intermediate station 12 to the article forming station 14, the motor 136 is operated as aforementioned to drive the carriage 100. At this time the tongs 226 are gripping articles made in the previous cycle of operation of the machine. The carriage 100 moves from the station 12 to the station 14 carrying the parisons and the carriage 210 is pushed away from the station 14 carrying the articles. During this movement, which is servo-controlled according to a position against time curve designed to minimise distortion of the parisons and articles, the blowheads are lowered into the parisons by the operation of the piston and cylinder assembly 224. When the parisons arrive at the article-forming station 14, the piston and cylinder assembly 178, 180 is operated to raise the bottom plates 172 and the piston and cylinder assembly 152, 154 is operated to move the mould side portions 170 into engagement with one another and with the bottom plates 172 to define mould cavities surrounding the parisons. The blowheads are now used to blow air into the parisons to cause them to expand to the shape of the mould cavities. When the parisons have expanded, the piston and cylinder assemblies 124, 134 are operated to separate the neck ring halves 114. The carriage 100 is now returned to the intermediate station 12 by operation of the motor 136 in the opposite direction. The articles held by the tongs 226 are now released on to the dead plate by operation of the piston and cylinder assemblies 228 to open the tongs 226. The piston and cylinder assemblies 218, 220 are now operated to return the carriage 210 to the article-forming station 14. At the station 14, the piston and cylinder assemblies 228 are operated to close the tongs 226 so that the newly-formed articles are gripped. The piston and cylinder assemblies 152, 154 and 178, 180 are now operated to separate the side portions 170 and lower the bottom plates 72 to allow removal of the articles.

I claim:

1. A mold mechanism for a glassware forming machine comprising mold clamping means including a pair of opposed pivotally supported levers, means for pivotally displacing said levers including first cylinder means having a piston rod secured to said levers, said piston rod having a bore therein, second cylinder means including fixed cylindrical housing means matingly received within said piston rod bore, said cylindrical housing means having a cylindrical inner bore and a concentric radially spaced tube located therein, and piston means having a bore extending therethrough for mating axial displacement along said tube and an outer diameter for axial mating displacement within said second cylinder inner bore, said piston means bore terminating with an enlarged chamber at the top thereof, said plenum chamber having a plurality of axially extending holes extending through the top thereof, mold means secured to the top of said plenum chamber and having a plurality of holes extending axially therethrough in communication with said axially extending holes in the top portion of said plenum chamber, and means for displacing said piston means from an upper glassware forming position to a lower position.

* * * * *